(12) United States Patent
Jeon et al.

(10) Patent No.: US 7,104,775 B2
(45) Date of Patent: Sep. 12, 2006

(54) INJECTION UNIT HAVING ROTATABLE DEVICE FOR PREVENTING REVERSE FLOW

(75) Inventors: Han Soo Jeon, Gyeonggi-do (KR); Young Jin Park, Gyeonggi-do (KR); Jin Young Kim, Gyeonggi-do (KR); Dong Sung Kim, Gyeonggi-do (KR); Sung Chul Shin, Seoul (KR); Kyoung Hun Han, Gyeonggi-do (KR)

(73) Assignee: LG Cable Ltd., Seoul (KR)

( * ) Notice: Subject to any disclaimer, the term of this patent is extended or adjusted under 35 U.S.C. 154(b) by 348 days.

(21) Appl. No.: 10/808,818

(22) Filed: Mar. 25, 2004

(65) Prior Publication Data

US 2004/0191359 A1   Sep. 30, 2004

(30) Foreign Application Priority Data

Mar. 27, 2003 (KR) ............. 10-2003-0019213

(51) Int. Cl.
*B29C 45/54* (2006.01)
(52) U.S. Cl. ............... 425/191; 425/209; 425/558
(58) Field of Classification Search ........... 425/190, 425/191, 208, 209, 558; 366/76.3, 79
See application file for complete search history.

(56) References Cited

U.S. PATENT DOCUMENTS

| | | | | |
|---|---|---|---|---|
| 3,438,393 A | * | 4/1969 | Godley | 137/533.17 |
| 4,349,044 A | * | 9/1982 | Schirmer | 137/512.3 |
| 4,472,058 A | * | 9/1984 | Pirro | 366/78 |
| 4,477,242 A | * | 10/1984 | Eichlseder et al. | 425/207 |
| 4,512,733 A | | 4/1985 | Eichlseder et al. | 425/207 |
| 4,850,851 A | * | 7/1989 | Dinerman | 425/562 |
| 5,164,207 A | | 11/1992 | Durina | 425/382.4 |
| 5,439,633 A | * | 8/1995 | Durina et al. | 264/328.17 |
| 6,007,322 A | | 12/1999 | Suumen et al. | 425/557 |
| 2004/0253335 A1 | * | 12/2004 | Anderson et al. | 425/205 |

* cited by examiner

*Primary Examiner*—Duane Smith
*Assistant Examiner*—Emmanuel S. Luk
(74) *Attorney, Agent, or Firm*—McCarter & English, LLP

(57) ABSTRACT

Disclosed is an injection unit having a rotatable device for preventing reverse flow. To connect first flow channels formed in a spacer and second flow channels formed in a screw head when the metering is performed, and prevent reverse flow of resin by cutting off the first flow channels and the second flow channels when the resin is injected, the injection unit has a torsion spring as spring means between a shaft of the screw head and a screw, thereby rapidly preventing movement of the melted resin by restoring force of the spring when the metering of the resin is finished.

12 Claims, 8 Drawing Sheets

INJECTION UNIT HAVING ROTATABLE DEVICE FOR PREVENTING REVERSE FLOW

BACKGROUND OF THE INVENTION

1. Field of the Invention

The present invention relates to an injection unit for injecting resin into a mold, which is manufactured in accordance with the shape of a product to be molded, and more particularly, to an injection unit having a rotatable device for preventing reverse flow, which can open flow channels for passing resin therethrough when the resin is metered and accumulated and cut off the flow channels when the resin is injected into the mold after the accumulation of the resin.

2. Background of the Related Art

In general, an injection unit is intended to inject resin into a mold manufactured in accordance with the shape of a product to be molded. More particularly, the injection unit includes the steps of melting resin pellets of a solid state by mechanical energy obtained by rotation of a screw mounted inside a barrel and thermal energy obtained by a heater mounted on the outer surface of the barrel, injecting melted resin into the mold manufactured in accordance with the shape of the product to be molded, and cooling the injected resin for obtaining the product of a desired shape.

At this time, the screw mounted inside the barrel includes a screw part for transferring and melting the resin pellets of the solid state, and a screw head for preventing a reverse flow of the resin when the melted resin is injected into the mold.

The resin pellets provided through a hopper are fed into the barrel having the heater therein, and the resin pellets are melted by shearing heat, which is generated while an injection screw connected to a hydraulic motor or an electric motor is rotated, and heat of the heater. After that, the melted resin passes through the screw head of the injection screw and is accumulated on the front end portion of the screw head.

At this time, if the pressure of the melted resin accumulated on the front end portion of the screw head is larger than the back pressure of the screw set previously, the screw is retreated in a hopper direction to which the resin is provided along an axial direction by the pressure of the melted resin, and continuously, the resin is accumulated on the front end portion of the screw head. When the accumulated resin is metered to a fixed amount at the front end portion of the screw head, the screw stops the rotation, advances in the axial direction with pressure and speed complying with molding conditions, and then, pushes the melted resin into the mold.

At this time, when the pushed resin flows backwardly in the hopper direction, as the amount of the pushed resin is shorter than the determined amount, a deviation in the amount of the resin is generated. To solve the above problem, lots of injection units having melted resin reverse flow prevention devices have been disclosed.

FIGS. 1 and 2 show a melted resin reverse flow prevention device of a conventional plastic injection unit.

FIG. 1 is a view of a conventional injection unit having a check ring for preventing reverse flow of melted resin.

In FIG. 1, when an injection screw 3 rotates, the melted resin provided into a barrel 2 moves in a direction of a screw head 7 along a screw thread of the injection screw 3. Therefore, the melted resin flows into a space between a spacer 6 and a check ring 5, and continuously, moves along a path between the check ring 5 and the screw head 7. The melted resin passed between the check ring 5 and the screw head 7 is gradually accumulated onto the front end portion of the barrel 2, and thereby, a pressure is formed by the accumulated resin. By the pressure, the screw 3 fills the front end portion of the barrel 2 with the melted resin of the fixed amount while being retreated, and then, stops. To inject the melted resin, the injection screw 3 advances again to push the melted resin into the mold. At this time, the check ring 5 contacts with the spacer 6 to cut off the flow channel of the melted resin, so that the melted resin is prevented from reverse flow.

However, the check ring 5 has a section where the melted resin moves in the axial direction when the flow channels of the melted resin are cut off, and as a result, it cannot be prevented that the melted resin as much as the volume obtained by multiplying the movement section by the sectional area of the flow channel is flown backwardly. Furthermore, a deviation may be generated in amount of the melted resin as the timing, in which the check ring 5 is interrupted, can be varied by viscosity or temperature of the melted resin.

In FIG. 2, when the conventional injection screw 3 rotates, the melted resin provided into the barrel 2 is gradually accumulated in the front end portion of the barrel 2 after passing a ball valve 8 disposed on a flow channel side of the screw head 7. The injection screw 3 pushes the melted resin of the fixed amount into the mold after retreating to a predetermined distance by the pressure of the accumulated resin.

However, in this case, the melted resin as much as the volume obtained by multiplying the retreated section by the path is flown backwardly, and thereby, a deviation is generated in supply of the melted resin of the fixed amount. Moreover, a deviation may be generated in amount of the melted resin as the timing, in which the flow channel of the melted resin is interrupted by the ball valve 8, can be varied by viscosity or temperature of the melted resin.

Meanwhile, U.S. Pat. No. 5,164,207 discloses a plastic extruder with automatic shut-off valve, in which melted resin flow channels are opened by applying power greater than elastic force of a spring to a poppet during metering, and closed by the poppet retreating in an axial direction by restoring force of the spring when the metering is finished.

However, U.S. Pat. No. 5,164,207 has a problem in that it is difficult to inject resin of a fixed amount as the melted resin filling a path where the poppet and the flow channel are joined with each other is moved.

That is, the above prior arts have the same problem in that it is difficult to inject resin of a desired amount as the melted resin pushed out from the injection screw directly before the injection of the melted resin after the metering is flown backwardly according to the axial movement of the valve.

In addition, the prior arts have another problem in that a deviation is generated in quantity of the resin, which must be provided in the fixed amount, as the timing for cutting off the flow channel is varied by the movement of the valve according to the viscosity or temperature of the melted resin, acceleration of the screw during the injection, and so on.

Due to the deviation in quantity of the melted resin, the product manufactured by the prior art cannot be manufactured in a desired weight, and may be manufactured in uneven volume.

Furthermore, the prior arts have a further problem in that additional expenses are required, and in case of need, the screw has to be replaced with a new one as a mixing nozzle or a mixing screw is used additionally when additional agent or coloring agent is mixed with the resin.

SUMMARY OF THE INVENTION

Accordingly, the present invention is directed to an injection unit having a rotatable device for preventing reverse flow that substantially obviates one or more problems due to limitations and disadvantages of the related art.

An object of the present invention is to provide an injection unit having a rotatable device for preventing reverse flow of melted resin, in which a torsion spring is mounted on a screw head to automatically interrupt the movement of the melted resin by restoring force of the spring at the time of completion of metering of the resin.

Another object of the present invention is to provide an injection unit having a rotatable device for preventing reverse flow, which has a device for mixing additional agent or coloring agent with the resin, so that the additional cost for mixing the additional agent or coloring agent with the resin is not needed and there is no need to replace the screw with a new one.

To achieve these objects, according to present invention, there is provided an injection unit having a rotatable device for preventing reverse flow including: an injection screw rotatably mounted inside a cylindrical barrel to inject resin into the cylindrical barrel therethrough; a spacer mounted at an end portion of the injection screw, the spacer rotating integrally with the injection screw and having at least one or more first flow channels arranged on the circumferential surface thereof at predetermined intervals; a screw head perforating the spacer and rotatably supported on the injection screw, the screw head having at least one or more second flow channels arranged on the circumferential surface thereof at predetermined intervals and corresponding to the first flow channels; spring means mounted at an end to the injection screw and mounted at the other end to the screw head, the spring means elastically accumulating a repulsive force when the injection screw rotates and being elastically restored to an original position when the rotation of the injection screw stops; and channel phase control means for rotatably connecting the screw head relative to the spacer, so that the phase of the first flow channels corresponds to the phase of the second flow channels by being rotated in the first direction when the injection screw rotates, and the phase of the first flow channels is discordant to the phase of the second flow channels by being rotating in the second direction, which is the opposite direction of the first direction, when the rotation of the injection screw stops.

It is preferable that the injection screw has a helical thread formed on the circumferential surface thereof.

The channel phase control means restricts a difference between the phase of the first flow channels and the phase of the second flow channels to a predetermined range. For this, the channel phase control means includes: a screw head fixing pin mounted in the spacer; and a pin guide groove for inserting the fixing pin therein, the pin guide groove being formed in the circumferential direction of the screw head to restrict the rotational angle of the fixing pin in the circumferential direction of the screw head. It is preferable that the first flow channels have the same number as the second flow channels and the number of the first flow channels is at least one or more.

In this case, according to the angle formed between the flow channels, the rotational angle of the fixing pin rotating on the circumferential surface of the screw head is determined, and it is preferable that the fixing pin is rotated at half the angle formed between the flow channels.

It is preferable that the present invention further comprises a mixer shaft mounted on the rotary shaft of the screw head for mixing the resin. It is preferable that the mixer shaft has a number of mixing pins arranged in a lattice form, and the mixing pins arranged in the lattice form are divided into the first row and the second row crossing the first row.

The above objects and other advantages of the invention may be realized and attained by the structure particularly pointed out in the written description and claims hereof as well as the appended drawings.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
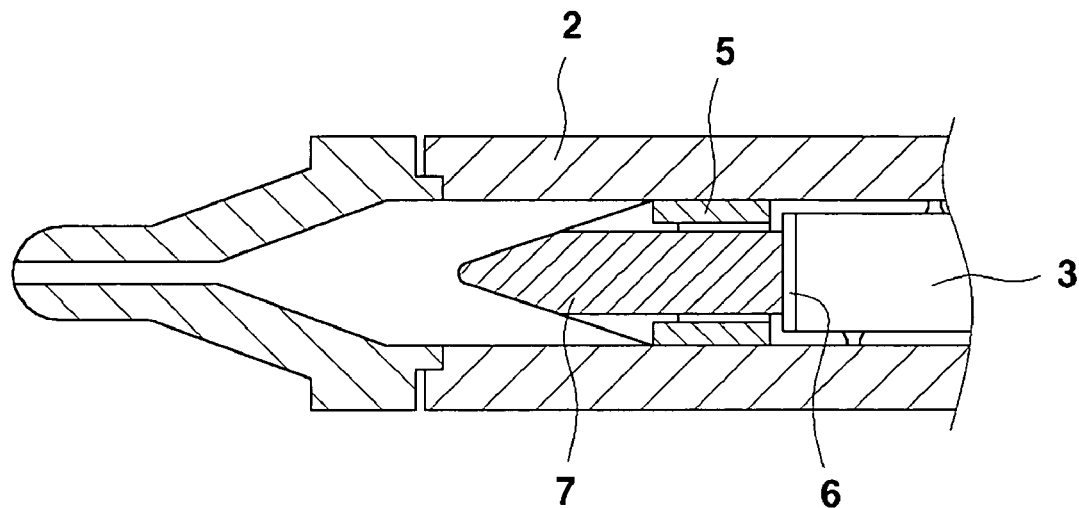
FIG. 1 is a view of a conventional injection unit having a check ring for preventing reverse flow of melted resin.
Figure 2:
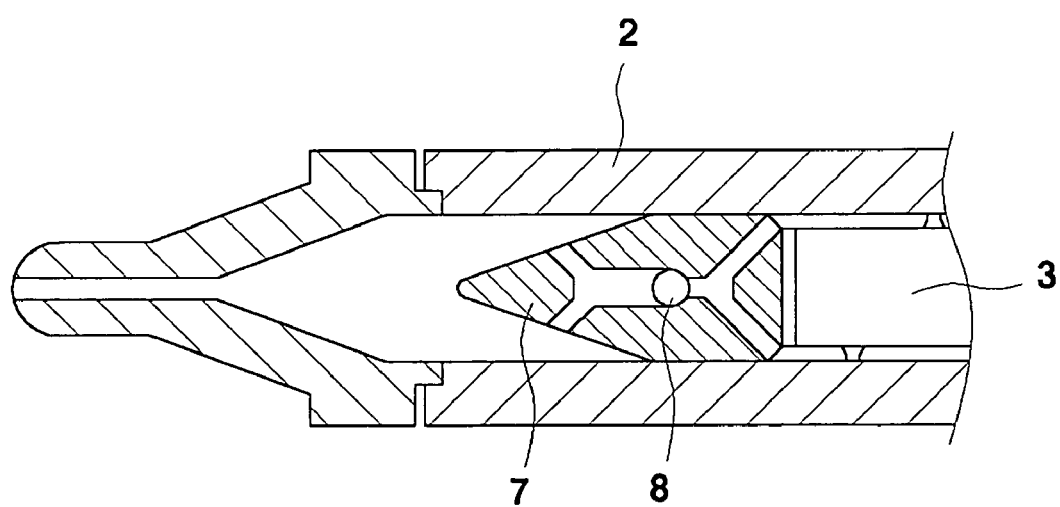
FIG. 2 is a view of another conventional injection unit having a ball valve for preventing reverse flow of melted resin.
Figure 3:
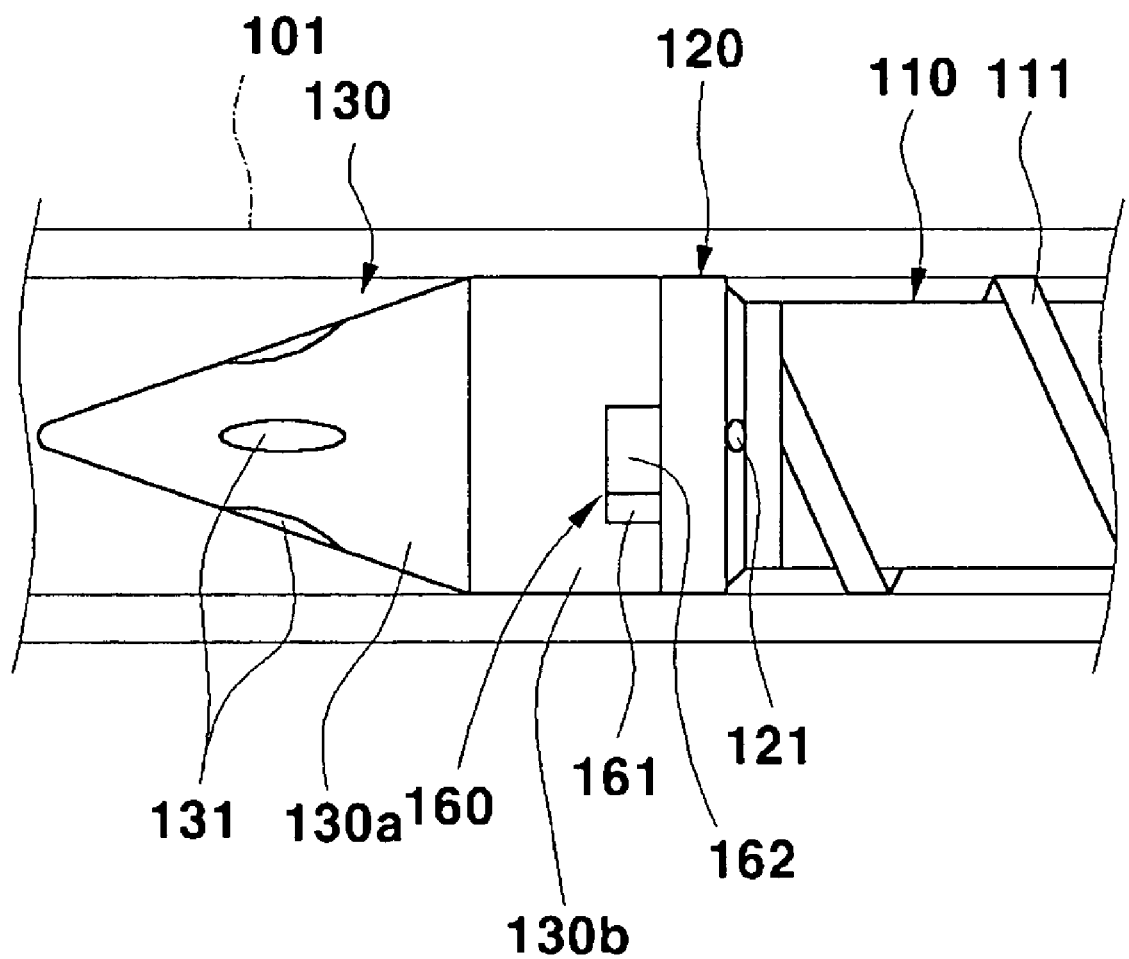
FIG. 3 is a structural view of an injection unit having a rotatable device for preventing reverse flow according to a preferred embodiment of the present invention.
Figure 4:
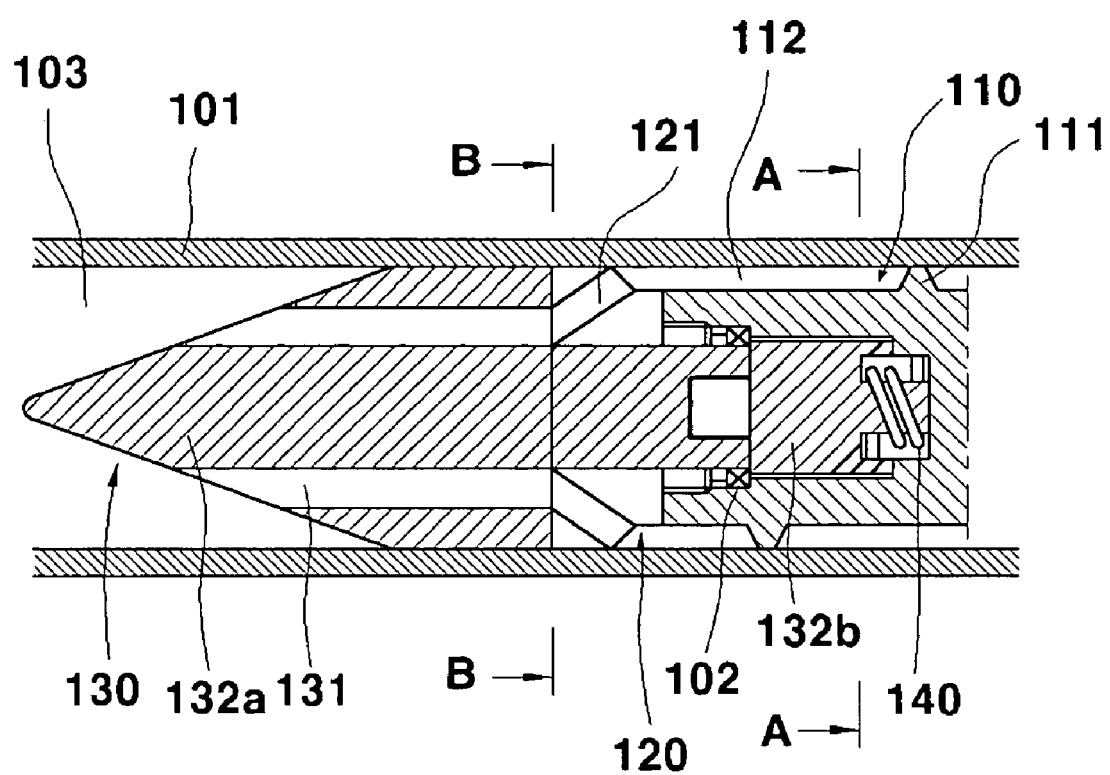
FIG. 4 is a sectional view of the injection unit having the rotatable device for preventing reverse flow according to the preferred embodiment of the present invention.
Figure 5:
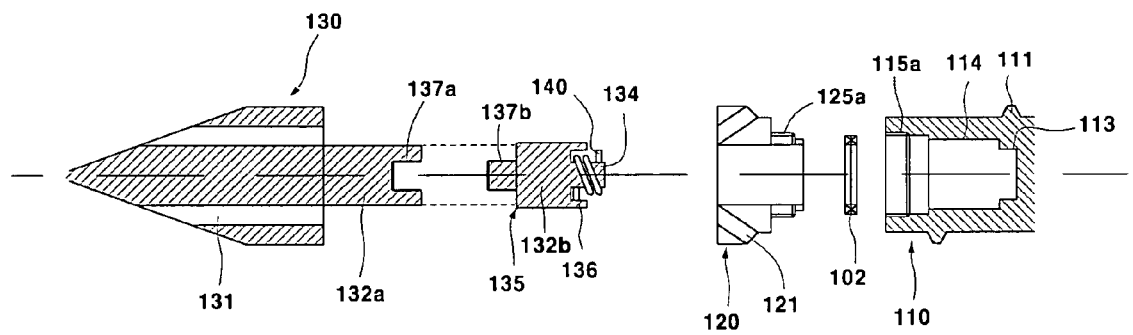
FIG. 5 is an exploded view of the injection unit having the rotatable device for preventing reverse flow according to the preferred embodiment of the present invention.

FIG. 3 is a structural view of an injection unit having a rotatable device for preventing reverse flow according to a preferred embodiment of the present invention, FIG. 4 is a sectional view of the injection unit having the rotatable device for preventing reverse flow, and FIG. 5 is an exploded view of the injection unit having the rotatable device for preventing reverse flow.

As shown in FIG. 3, the injection unit according to the present invention includes: an injection screw 110 having an inner hole and a helical thread III formed on the outer surface thereof; a screw head 130 fit to an end of the inner hole of the injection screw 110 by a torsion spring 140 and having at least one or more second flow channels 131; a spacer 120 inserted into a space formed between the injection screw 110 and the screw head 130 and having at least one or more first flow channels 121; and channel phase control means 160 for control correspondence and discordance between the first flow channels 121 and the second flow channels 131.

The injection screw is mounted inside a cylindrical barrel 101 for injection.

Here, the screw head 130 according to the present invention includes a conical member 130a having a diameter gradually reduced toward an injection direction, and a cylindrical member 130b extending from the bottom surface of the conical member 130a. The screw head 130 has the second flow channels 131, which are separated from the center thereof at a predetermined interval, parallel to the axial direction, and arranged at regular intervals on the circumference thereof.

As shown in FIGS. 4 and 5, the screw head 130 includes a first rotary shaft 132a formed at the center thereof in the axial direction and inserted into the hole of the injection screw 110, and a second rotary shaft 132b connected to the first rotary shaft 132a. The first and second rotary shafts 132a and 132b are coupled with each other in the rotational direction without slip. In the injection unit according to the present invention, the first rotary shaft 132a has a female screw portion 137a having a predetermined depth, and the second rotary shaft 132b has a male screw portion 137b protruding to a predetermined height corresponding to the depth of the female screw portion 137a. Therefore, the first and second rotary shafts 132a and 132b of the screw head 130 are removably coupled with each other.

An end portion of the second rotary shaft 132b mounted to the injection screw 110 has a protrusion 134 formed at the center thereof and a spring support portion 136 formed on the edge thereof. The torsion spring 140 is fit onto the protrusion 134, and an end portion of the torsion spring 140 is fit and supported to the spring support portion 136.

The first and second rotary shafts 132a and 132b coupled with each other as the above are fit onto a bearing 102 to be rotated in a fixed condition. In this case, the second rotary shaft 132b has a locking protrusion 135 caught and fixed to the bearing 102 and the spacer 120.

The spacer 120 includes a bolt portion 125a formed on an end portion thereof and screwed with a nut portion 115a of the injection screw 110, and the first flow channels 121 arranged on the circumferential surface thereof at regular intervals and inclined relative to the axial direction. The first flow channels 121 have the same number as the second flow channels 131 to be coupled with the second flow channels 131 respectively, and are arranged on the corresponding positions to the second flow channels 131 to be communicated with the second flow channels 131 when the screw head 130 and the spacer 120 are coupled with each other.

In the embodiment of the present invention, the four first and second flow channels 121 and 131 are arranged at intervals of 90° respectively.

The injection screw 110 has the helical thread 111 formed on the outer surface thereof, and a cylindrical hole 114 formed therein and inserted onto the second rotary shaft 132b. The cylindrical hole 114 has a spring support slot 113 formed at an end thereof. The spring support slot 113 supports an end of the torsion spring 140 of which the other end is connected to the spring support portion 136.

The injection process of the present invention will be described as follows.

First, when the injection screw 110 rotates, the melted resin advances to the space 112 formed between the barrel 101 and the injection screw 110 in the direction of the screw head 130. The melted resin advancing as the above passes the spacer 120 through the first flow channels 121, and then, passes the screw head 130 through the second flow channels 131 connected with the first flow channels 121. The melted resin passed the screw head 130 is accumulated on the front end portion 103 of the screw head inside the barrel 101 in order.

The melted resin accumulated as the above generates pressure in the opposite direction to the injection direction of the resin. The pressure of the melted resin retreats the injection unit in the opposite direction of the injection. After that, when the front end portion 103 of the screw head is filled with the melted resin of a wanted amount, the injection unit according to the present invention stops the driving at the same time with the stop of means such as a motor unit(not shown in the drawings) connected to a shaft of the injection unit.

The injection unit according to the present invention cuts off the connection between the first flow channels 121 and the second flow channels 131 by the elastically restoring force of the torsion spring 140 at the same time with the stop of the injection unit, and then, advances in the injection direction for injecting the melted resin.

Referring to FIGS. 6A to 7B, the operation of the injection unit according to the present invention will be described in more detail as follows.

Figure 6A:
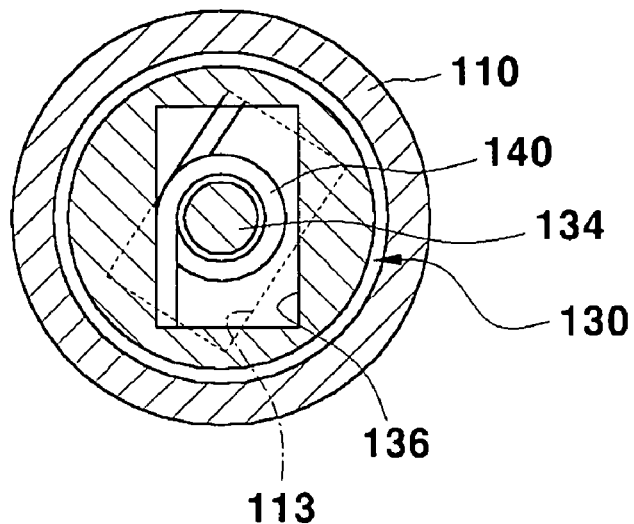
FIG. 6A is a sectional view taken by the line of A—A of FIG. 4, showing a state in which a first flow channel and a second flow channel are connected with each other.
Figure 6B:
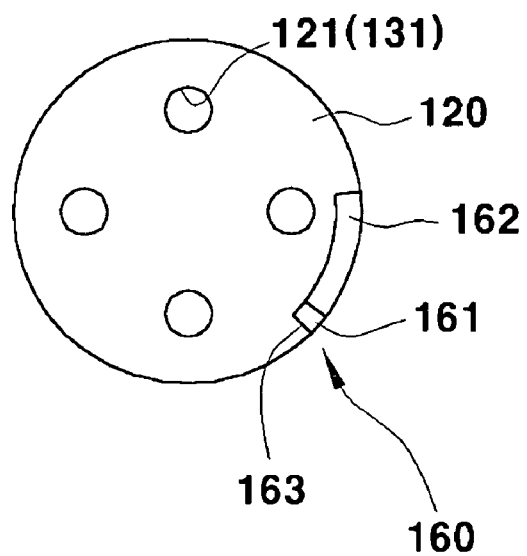
FIG. 6B is a sectional view taken by the line of B—B of FIG. 4, showing a state in which the first flow channel and the second flow channel are connected with each other.
Figure 7A:
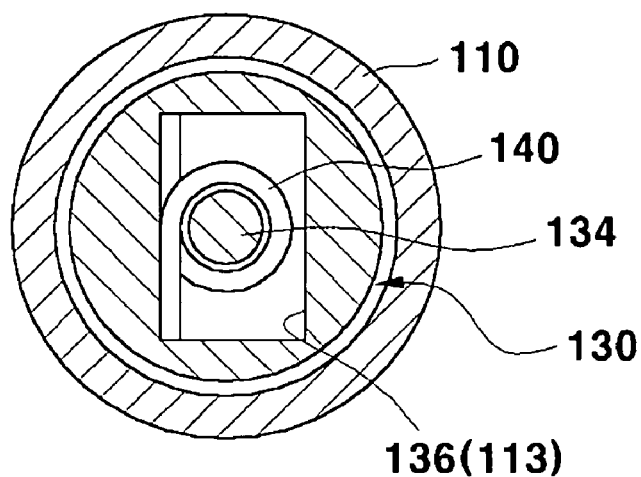
FIG. 7A is a sectional view taken by the line of A—A of FIG. 4, showing a state in which the first flow channel and the second flow channel are cut off from each other.
Figure 7B:
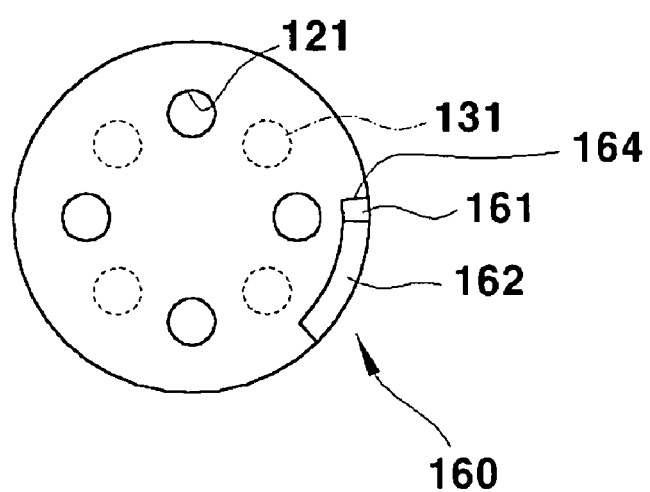
FIG. 7B is a sectional view taken by the line of B—B of FIG. 4, showing a state in which the first flow channel and the second flow channel are cut off from each other.

FIG. 6A is a sectional view taken by the line of A—A of FIG. 4, showing a state in which the first flow channels and the second flow channels are connected with each other, FIG. 6B is a sectional view taken by the line of B—B of FIG. 4, showing a state in which the first flow channels and the second flow channels are connected-with each other, FIG. 7A is a sectional view taken by the line of A—A of FIG. 4, showing a state in which the first flow channels and the second flow channels are cut off from each other, and FIG. 7B is a sectional view taken by the line of B—B of FIG. 4, showing a state in which the first flow channels and the second flow channels are cut off from each other.

As shown in FIGS. 6A to 7A, the torsion spring 140 as spring means is mounted between the injection screw 110 and the screw head 130. The torsion spring 140 is inserted onto the protrusion 134 formed on the end of the second rotary shaft 132b of the screw head 130. Furthermore, an end of the torsion spring 140 is supported on the inner surface of the spring support slot 113 of the injection screw 110, and the other end of the torsion spring 140 is supported on the inner surface of the spring support portion 136 formed on the end of the second rotary shaft 132b of the screw head 130. As shown in FIG. 7a, the inner surface of the spring support slot 113 corresponds to the inner surface of the spring support portion 136.

By the above connection, the torsion spring 140 transfers the rotational force of the injection screw 110 to the screw head 130.

Here, as shown in FIG. 6A, the torsion spring 140 is elastically compressed when the injection screw 110 rotates. On the other hand, when the injection screw 110 stops, as shown in FIG. 7A, the torsion spring 140 is elastically restored to its original position.

As described above, the present invention is restricted to that the screw head 130 is rotated by the torsion spring 140, and has the channel phase control means 160 for cutting off the connection path between the first and second flow channels 121 and 131 when the injection 15 screw 110 stops and for communicating the first and second flow channels 121 and 131 at predetermined rotation angles when the injection screw 110 rotates.

The channel phase control means 160 includes: a screw head fixing pin 161 mounted on the front end surface of the spacer 120 and rotating together with the spacer 120; and a pin guide groove 162 for inserting the fixing pin 161, the pin guide groove 162 being formed in the screw head 130 in a circumferential direction of the screw head 130 to rotate the screw head 130 within a predetermined angle range.

The pin guide groove 162 has different circular arc angles according to the number of the second flow channels 131 having the same number as the first flow channels 121. The pin guide groove 162 according to the preferred embodiment of the present invention has the circular arc angle of 45 degrees, which is half of angle between the adjacent flow channels as the present invention has the four first flow channels 121 and the four second flow channels 131.

Therefore, as shown in FIG. 6B, when the fixing pin 161 formed on the spacer 120 is caught to a channel opening portion 163 of the pin guide groove 162, the first and second flow channels 121 and 131 communicate with each other. As shown in FIG. 7B, when the fixing pin 161 formed on the spacer 120 is caught to a channel closing portion 164 of the pin guide groove 162, the first and second flow channels 121 and 131 are located at different positions from each other, and thereby, the connection path between the first and second flow channels is cut off.

The injection process of the injection unit having the channel phase control means 160 will be described as follows.

When the injection unit does not work, as shown in FIGS. 7A and 7B, the first and second flow channels 121 and 131 keep the closed condition by the elastic force of the torsion spring 140.

To drive the injection unit of the present invention, first, the melted resin is accumulated on the front end portion 103 of the screw head. For this, when the injection screw 110 rotates in the counterclockwise direction in the condition of FIG. 7A, as shown in FIGS. 6A and 6B, the spring support slot 113 is rotated in the clockwise direction of the drawings, and then, the fixing pin 161 is caught to the channel opening portion 163. In the above condition, the first and second flow channels 121 and 131 are communicated with each other.

In this case, while the injection screw 110 and the screw head 130 are rotated integrally, the melted resin is transferred to the screw head 130 through the first flow channels 121 and through the second flow channels 131 connected with the first flow channels 121 in order. Therefore, the resin is forcedly transferred to the front end portion 103 of the screw head 130.

At this time, in the channel opening condition shown in FIG. 6A, the torsion spring 140 is elastically compressed and repulsive force acts in the opposite direction to the rotation direction of the injection screw 110. So, to continuously keep the channel opening condition shown in FIG. 6A, the power for rotating the injection screw 110 by a device such as an electric motor(not shown in the drawing) must be greater than the elastically repulsive force of the torsion spring 140.

As a result, when the injection screw 110 rotates, as the second flow channels 131 of the screw head 130 rotated by the fixing pin 161 communicate with the first flow channels 121 of the spacer 120, the resin forcedly transferred by the helical thread 111 of the injection screw 110 is accumulated on the front end portion 103 of the screw head through the first and second flow channels 121 and 131 connected with each other.

If the pressure by the resin accumulated on the front end portion 103 of the screw head is ascended to a predetermined level, the injection screw 110 is retreated to a predetermined distance.

If the melted resin is accumulated to a desired amount, the injection screw 110 is stopped by the stop of the device such as the electric motor(not shown). The accumulated amount of the resin can be metered directly, or presumed by measuring the retreated distance of the injection screw 110.

When the injection screw 110 stops, the torsion spring 140 rotating together with the injection screw 110 is restored into the initial position by the accumulated elastically repulsive force as shown in FIG. 7A.

That is, as shown in FIG. 7B, the first and second flow channels 121 and 131 are located at different phases from each other and cut off from each other, and thereby, the resin inside the second flow channels 131 cannot be flown backwardly to the first flow channels 121.

Therefore, the injection unit according to the present invention can inject the resin without the reverse flow of the resin when performing the injection motion for pushing the accumulated resin of the front end portion of the screw head 130 into the mold by a rectilinear movement in the injection direction after the injection screw 110 stops.

Figure 8:
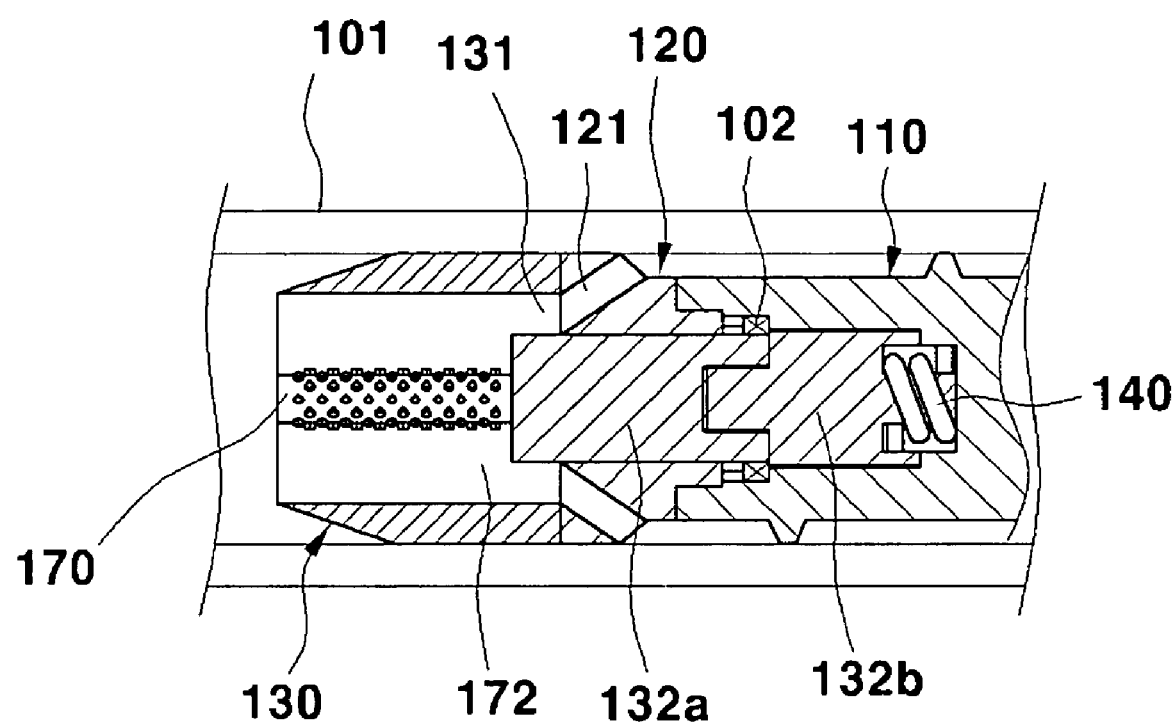
FIG. 8 is a view of an embodiment of the injection unit on which a device for mixing resin is mounted.

FIG. 8 shows a preferred embodiment of the injection unit having a device for mixing the resin.

As shown in FIG. 8, the injection unit according to the present invention may have a mixing space 172. Here, the screw head 130 includes a mixer shaft 170 for mixing the melted resin discharged through the second flow channels 131 inside the mixing spacer 172.

The mixer shafts 170 are connected with the first and second rotary shafts 132a and 132b of the screw head 130. Therefore, when the first and second rotary shafts 132a and 132b are rotated, also the mixer shafts 170 for mixing the resin are rotated.

Figure 9A:
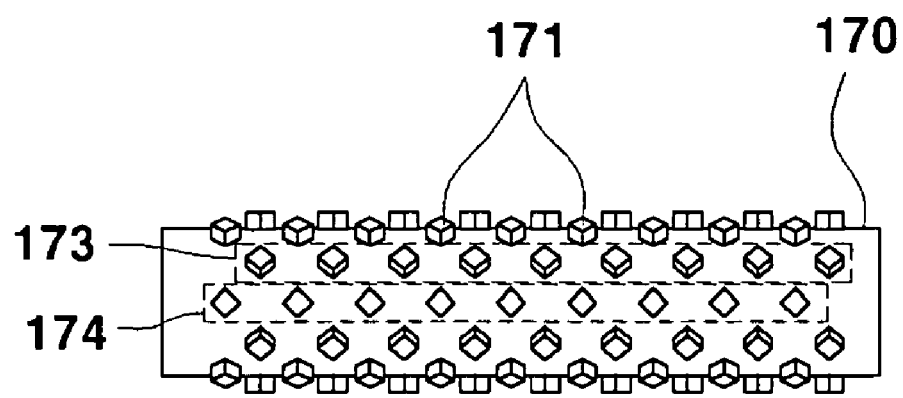
FIG. 9A is a structural view of a mixer shaft according to the present invention.
Figure 9B:
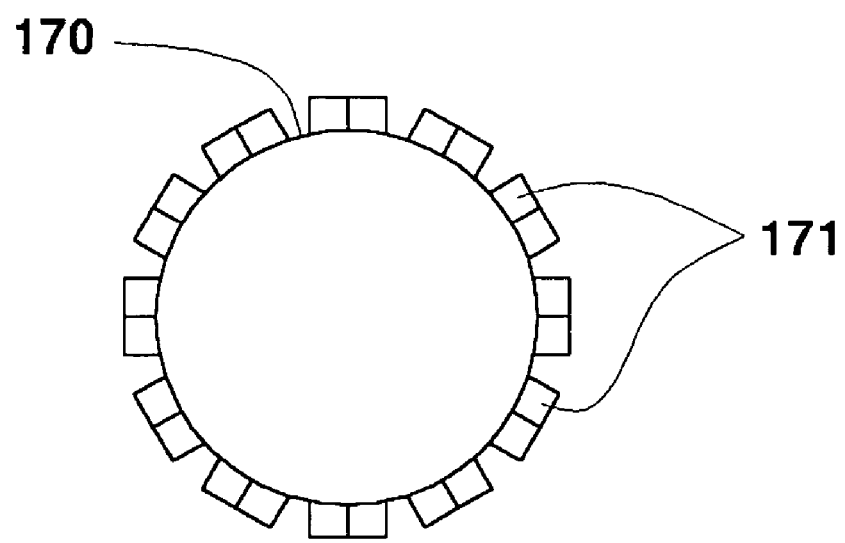
FIG. 9B is a sectional view of the mixer shaft according to the present invention.

FIG. 9A is a structural view of the mixer shaft according to the present invention, and FIG. 9B is a sectional view of the mixer shaft.

As shown in FIGS. 9A and 9B, the mixer shaft 170 includes a number of mixing pins 171 formed on the circumferential surface thereof in all directions. The mixing pins 171 are arranged in a lattice form. The mixing pins 171 arranged in the lattice form are divided into a first row 173 and a second row 174 along an axis, and in this case, it is preferable that the first and second rows 173 and 174 are arranged on the circumferential surface thereof in turns.

As a result, the present invention can evenly mix additional agent, coloring agent, and the resin accumulated by rotating the mixer shafts 170 while the resin is accumulated on the front end portion.

In a modification of the present invention, the screw head and the injection screw are fixed and coupled with each other, and the spacer can be rotated within a predetermine angle range relative to the fixed screw head and injection screw. Thereby, the flow channels formed in the screw head and the flow channels formed in the spacer can be communicated with each other or cut off from each other like the driving principle described above.

Moreover, in the present invention, at least one or more of the first and second flow channels can be formed, for example, one first flow channel and one second flow channel, two first flow channels and two second flow channels, three first flow channels and three second flow channels, and so on. In this case, the intervals among the adjacent flow channels are uniform, and the pin guide groove can be formed at half the angle corresponding to the interval between the flow channels. In addition, the angle of the pin guide groove is relatively smaller than the angle corresponding to the interval between the flow channels, for example, 1/3 or 2/3 times.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An injection unit having a rotatable device for preventing reverse flow, the injection unit comprising:

an injection screw rotatably mounted inside a cylindrical barrel to inject resin into the cylindrical barrel therethrough;

a spacer mounted at an end portion of the injection screw, the spacer rotating integrally with the injection screw and having at least one or more first flow channels arranged on the circumferential surface thereof at predetermined intervals;

a screw head perforating the spacer and rotatably supported on the injection screw, the screw head having at least one or more second flow channels arranged on the circumferential surface thereof at predetermined intervals and corresponding to the first flow channels;

spring means mounted at an end to the injection screw and mounted at the other end to the screw head, the spring means elastically accumulating a repulsive force when the injection screw rotates and being elastically restored to an original position when the rotation of the injection screw stops; and channel phase control means for rotatably connecting the screw head relative to the spacer, so that the phase of the first flow channels corresponds to the phase of the second flow channels by being rotated in the first direction when the injection screw rotates, and the phase of the first flow channels is discordant to the phase of the second flow channels by being rotating in the second direction, which is the opposite direction of the first direction, when the rotation of the injection screw stops.

2. The injection unit according to claim 1, wherein the injection screw has a helical thread formed on the circumferential surface thereof.

3. The injection unit according to claim 1, wherein the channel phase control means restricts a difference between the phase of the first flow channels and the phase of the second flow channels to a predetermined range.

4. The injection unit according to claim 3, wherein the channel phase control means includes: a screw head fixing pin mounted in the spacer; and a pin guide groove for inserting the fixing pin therein, the pin guide groove being formed in the circumferential direction of the screw head to restrict the rotational angle of the fixing pin in the circumferential direction of the screw head.

5. The injection unit according to claim 1, wherein the first flow channels have the same number as the second flow channels and;

the number of the first flow channels is at least one or more.

6. The injection unit according to claim 5, wherein the channel phase control means restricts a difference between the phase of the first flow channels and the phase of the second flow channels to a predetermined range.

7. The injection unit according to claim 6, wherein the channel phase control means includes: a screw head fixing pin mounted in the spacer; and a pin guide groove for inserting the fixing pin therein, the pin guide groove being formed in the circumferential direction of the screw head to restrict the rotational angle of the fixing pin in the circumferential direction of the screw head.

8. The injection unit according to claim 7, wherein the pin guide groove is formed at half the angle corresponding to the interval between the flow channels.

9. The injection unit according to claim 1, further comprising a mixer shaft mounted on the rotary shaft of the screw head for mixing the resin.

10. The injection unit according to claim 9, wherein the mixer shaft has a number of mixing pins arranged on the circumferential surface thereof.

11. The injection unit according to claim 10, wherein the mixing pins are arranged in a lattice form.

12. The injection unit according to claim 11, wherein the mixing pins arranged in the lattice form are divided into the first row arranged in an axial direction and the second row crossing the first row.

* * * * *